UNITED STATES PATENT OFFICE.

DUNCAN H. CAMERON, OF WOODVILLE, ONTARIO, CANADA, ASSIGNOR OF ONE-HALF TO DAVID ANNIS, OF SAME PLACE.

INCRUSTATION-PREVENTIVE.

SPECIFICATION forming part of Letters Patent No. 388,759, dated August 28, 1888.

Application filed June 26, 1886. Serial No. 206,311. (No specimens.) Patented in Canada September 17, 1885, No. 22,470.

*To all whom it may concern:*

Be it known that I, DUNCAN H. CAMERON, of Woodville, in the Province of Ontario, in the Dominion of Canada, have invented a new and useful Boiler-Cleaning Compound, of which the following is a specification, and for which I have received Letters Patent in Canada, No. 22,470, dated September 17, 1885.

My invention relates to a new composition or compound fluid extract to be used as a medium for cleaning boilers used for generating steam for engines.

My improved compound is produced from certain materials described below by the action of steam in the manner following: Take of cedar—the leaves and bark—five parts; tamarack—the leaves and bark—two parts; hemlock, oak, or sumac—the leaves and bark—three parts, all of which to be put together and placed in a steam-tight receiver, and passing into it a current of steam at a pressure of at least one atmosphere, which is conducted into the material and allowed to act upon it. After settling, the liquid is drawn off in the form of a fluid extract ready for use, and may be applied as follows: For a boiler sufficient to drive a thirty-horse-power engine and in good condition, put into it before firing up in the morning, or after, by the feed-pumps, one quart of the compound three times a week. This will prevent scaling. The compound may be condensed, so that a less quantity will do; but it will have to be regulated according to the state of the water and the size and condition of the boiler when commencing its use, which will in all cases have to be determined by the observations of the engineer who may happen to be in charge.

I claim as my invention—

A boiler-cleaning compound of a decoction of five parts, or thereabout, of the leaves and bark of cedar; two parts, or thereabout, of the leaves and bark of tamarack, and one part, or thereabout, of the leaves and bark of each hemlock, oak, and sumac, said decoction produced by steaming the ingredients in a closed vessel and then decanting the liquid and using the same in the proportions specified, substantially as set forth.

DUNCAN H. CAMERON.

Witnesses:
   D. LINDSAY,
   ALFRED E. LINDSAY.